US010688861B1

(12) United States Patent
Singh et al.

(10) Patent No.: US 10,688,861 B1
(45) Date of Patent: Jun. 23, 2020

(54) ENGINE AIRFLOW ADJUSTMENT SYSTEM

(71) Applicant: CNH Industrial America LLC, New Holland, PA (US)

(72) Inventors: Samrendra Kumar Singh, Bolingbrook, IL (US); Anna Jo Reisenauer, West Fargo, ND (US); Panos Tamamidis, Northbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/358,294

(22) Filed: Mar. 19, 2019

(51) Int. Cl.
| | |
|---|---|
| *B60K 11/06* | (2006.01) |
| *B60K 11/08* | (2006.01) |
| *F01P 11/10* | (2006.01) |
| *B62D 39/00* | (2006.01) |
| *F01P 11/12* | (2006.01) |
| *B60H 1/00* | (2006.01) |
| *F02M 35/16* | (2006.01) |

(52) U.S. Cl.
CPC .......... *B60K 11/06* (2013.01); *B60H 1/00407* (2013.01); *B60K 11/08* (2013.01); *B62D 39/00* (2013.01); *F01P 11/10* (2013.01); *F01P 11/12* (2013.01); *F02M 35/161* (2013.01)

(58) Field of Classification Search
CPC ...... B60K 11/08; B60K 11/085; B60K 13/02; B60K 13/06
USPC ................................................ 180/68.1, 68.2
See application file for complete search history.

(56) References Cited

U.S. PATENT DOCUMENTS

| | | | | |
|---|---|---|---|---|
| 4,081,050 A | * | 3/1978 | Hennessey | B60K 11/04 180/233 |
| 4,932,490 A | * | 6/1990 | Dewey | B60K 13/02 180/68.3 |
| 5,022,479 A | * | 6/1991 | Kiser | B60K 13/06 180/68.3 |
| 5,036,931 A | * | 8/1991 | Iritani | B60K 11/08 180/68.1 |
| 5,042,603 A | * | 8/1991 | Olson | B60K 13/02 180/68.3 |
| 5,054,567 A | * | 10/1991 | Hoffman | B60K 11/00 180/68.2 |
| 5,199,522 A | * | 4/1993 | Martenas | B60K 13/02 180/68.3 |
| 5,618,323 A | * | 4/1997 | Shearn | B60H 1/28 180/68.3 |
| 5,689,953 A | * | 11/1997 | Yamashita | B60K 11/02 123/41.49 |
| 5,775,450 A | * | 7/1998 | Porter | B60K 11/02 180/68.1 |

(Continued)

FOREIGN PATENT DOCUMENTS

| | | |
|---|---|---|
| EP | 0443210 A1 | 8/1991 |
| FR | 2667549 A1 | 4/1992 |

(Continued)

*Primary Examiner* — Jeffrey J Restifo
(74) *Attorney, Agent, or Firm* — Rickard K. DeMille; Rebecca L. Henkel

(57) ABSTRACT

An engine airflow adjustment system that includes an engine that powers operation of a vehicle. A fan drives an airflow over the engine to convectively cool the engine. A funnel receives a portion of the airflow from the fan and directs the airflow to a specific location on the engine to blow debris off of the engine.

14 Claims, 7 Drawing Sheets

(56) References Cited

U.S. PATENT DOCUMENTS

| | | | | |
|---|---|---|---|---|
| 6,167,976 B1 * | 1/2001 | O'Neill | ................. | B62D 25/10 |
| | | | | 123/41.49 |
| 6,257,359 B1 | 7/2001 | Granlund et al. | | |
| 7,143,852 B2 * | 12/2006 | Yatsuda | ................. | B62D 25/10 |
| | | | | 180/69.2 |
| 7,503,306 B2 * | 3/2009 | Knockl | ................. | B60K 11/06 |
| | | | | 123/198 E |
| 7,878,171 B2 * | 2/2011 | Vandike | ................. | F02M 35/02 |
| | | | | 123/198 E |
| 8,479,853 B2 * | 7/2013 | Verbrugge | ............ | B62D 25/12 |
| | | | | 180/68.2 |
| 8,528,679 B2 * | 9/2013 | Stuckey | ................. | B60K 13/02 |
| | | | | 180/68.3 |
| 8,893,835 B2 * | 11/2014 | Nam | ..................... | B60K 11/04 |
| | | | | 180/68.1 |
| 8,919,469 B2 * | 12/2014 | Shatters | ................. | B60K 11/00 |
| | | | | 180/68.1 |
| 8,936,122 B2 | 1/2015 | MacGregor et al. | | |
| 8,991,534 B2 | 3/2015 | Morey et al. | | |
| 9,273,649 B2 * | 3/2016 | Gomez | ................. | F02M 35/09 |
| 9,518,373 B1 * | 12/2016 | Ueda | .................... | E02F 9/0866 |
| 9,676,271 B1 * | 6/2017 | Barzen | .................. | B60K 11/08 |
| 2016/0009170 A1 | 1/2016 | Schneider | | |

FOREIGN PATENT DOCUMENTS

| | | |
|---|---|---|
| WO | 2008118062 A1 | 10/2008 |
| WO | 2016092795 A1 | 6/2016 |

* cited by examiner

_US 10,688,861 B1_

ENGINE AIRFLOW ADJUSTMENT SYSTEM

BACKGROUND

The present application relates generally to off-road vehicles.

Engines of off-road vehicles, such as trucks, tractors, combines, and other specialized vehicles used in various construction or agricultural applications, generally operate most efficiently within a range of engine temperatures. The engines of these off-road vehicles therefore include a fan that facilitates convective cooling of the engine. Unfortunately, during operation debris (e.g., leaves, stocks, roots) may be enter the engine compartment and settle in various locations. For example, debris may settle in crevices or gaps next to hot engine components.

BRIEF DESCRIPTION

In one embodiment, an engine airflow adjustment system that includes an engine that powers operation of a vehicle. A fan drives an airflow over the engine to convectively cool the engine. A funnel receives a portion of the airflow from the fan and directs the airflow to a specific location on the engine to blow debris off of the engine.

In another embodiment, an engine airflow adjustment system that includes a funnel that receives a portion of an airflow from a fan and directs the airflow to a specific location on an engine to blow debris off of the engine. The funnel includes a first sidewall with a first sidewall portion and a second sidewall portion. The first sidewall portion is angled relative to the second sidewall portion. A second sidewall is separated from the first sidewall by a gap. The second sidewall includes a third sidewall portion and a fourth sidewall portion. The third sidewall portion is angled relative to the fourth sidewall portion. A top wall couples to the first sidewall and the second sidewall. A front wall couples to the first sidewall and the second sidewall. The front wall guides the airflow from the fan away from the top wall of the funnel and towards the engine.

In another embodiment, an engine airflow adjustment system that includes a funnel that receives a portion of an airflow from a fan and directs the airflow to a specific location on an engine to blow debris off of the engine. The funnel includes a top wall and a first sidewall coupled to the top wall. The funnel also includes a second sidewall coupled to the top wall and separated from the first sidewall by a gap. A front wall couples to the first sidewall and the second sidewall. The front wall guides the airflow from the fan away from the top wall of the funnel and towards the engine. The front wall includes a first front wall portion. The first front wall portion is angled relative to the top wall. The front wall includes a second front wall portion. The second front wall portion is angled relative to the first front wall portion.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments discussed below are for an engine airflow adjustment system that redirects airflow in an engine compartment of an off-road vehicle, such as a tractor or other type of vehicle used for agricultural operations. During agricultural operations, such as harvesting, various plant matter and/or debris may be blown into the engine compartment of the off-road vehicle. The plant matter and/or debris may be blown in by wind and/or may be sucked in with the engine fan. This plant matter and/or debris may settle in various crevices and other constricted spaces around the engine. For example, the plant matter and/or debris may settle in crevices and other constricted spaces near hot engine components. In order to block and/or reduce plant matter and/or debris from settling into locations next to hot engine components, the engine airflow adjustment system focuses airflow from the engine fan to one or more locations in the engine. The concentrated airflow from the engine fan may therefore block settling and/or remove plant matter or other debris from the engine.

Figure 1:
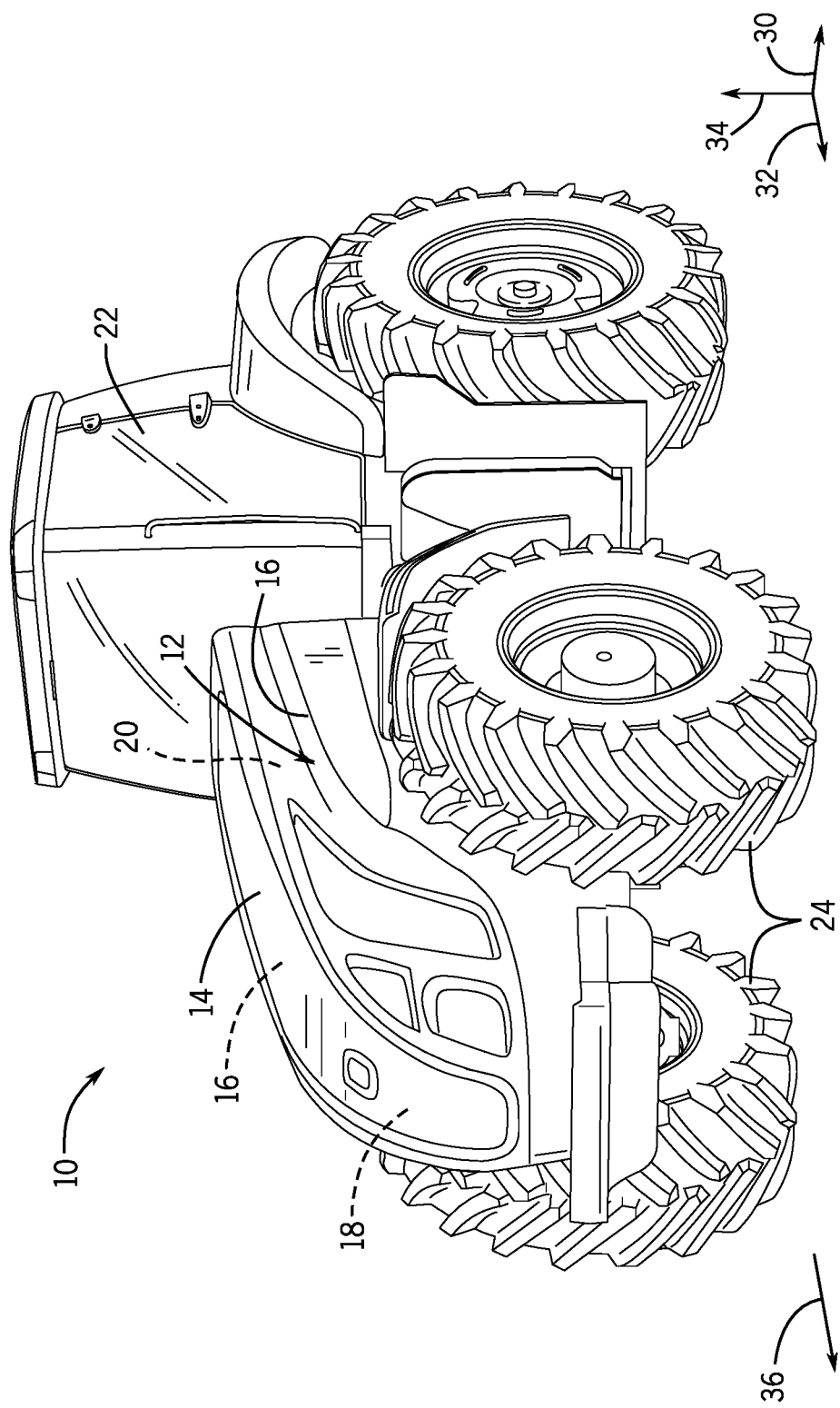
FIG. 1 is a perspective view of an off-road vehicle, according to an embodiment of the disclosure.

With the foregoing in mind, FIG. 1 is a perspective view of an exemplary off-road vehicle 10 that includes an engine airflow adjustment system 12 for adjusting air flow under an engine hood 14 of the off-road vehicle 10. As discussed in more detail below, the system 12 may include one or more funnels 16 that redirect and/or focus airflow driven by a fan 18 (e.g., engine fan) to specific locations on the engine 20 to remove and/or block settling of plant debris on the engine 20.

As shown, the off-road vehicle 10 has a cabin 22 where an operator may sit or stand to operate the off-road vehicle 10. In the illustrated embodiment, the vehicle 10 has wheels 24 that rotate to move the off-road vehicle 10. The off-road vehicle 10 may be further defined as having a lateral axis 30, a longitudinal axis 32, and a vertical axis 34. In operation, the vehicle 10 may travel in a forward direction 36 (e.g., direction of travel). In the illustrated embodiment, the vehicle 10 is an agricultural tractor. However, any suitable agricultural or off-road vehicle, including self-propelled vehicles, sprayers, combines, trucks, and so forth may utilize aspects of the disclosed embodiments. It should be understood that in some vehicles, the wheels 24 may be replaced with tracks or other drive systems.

Figure 2:
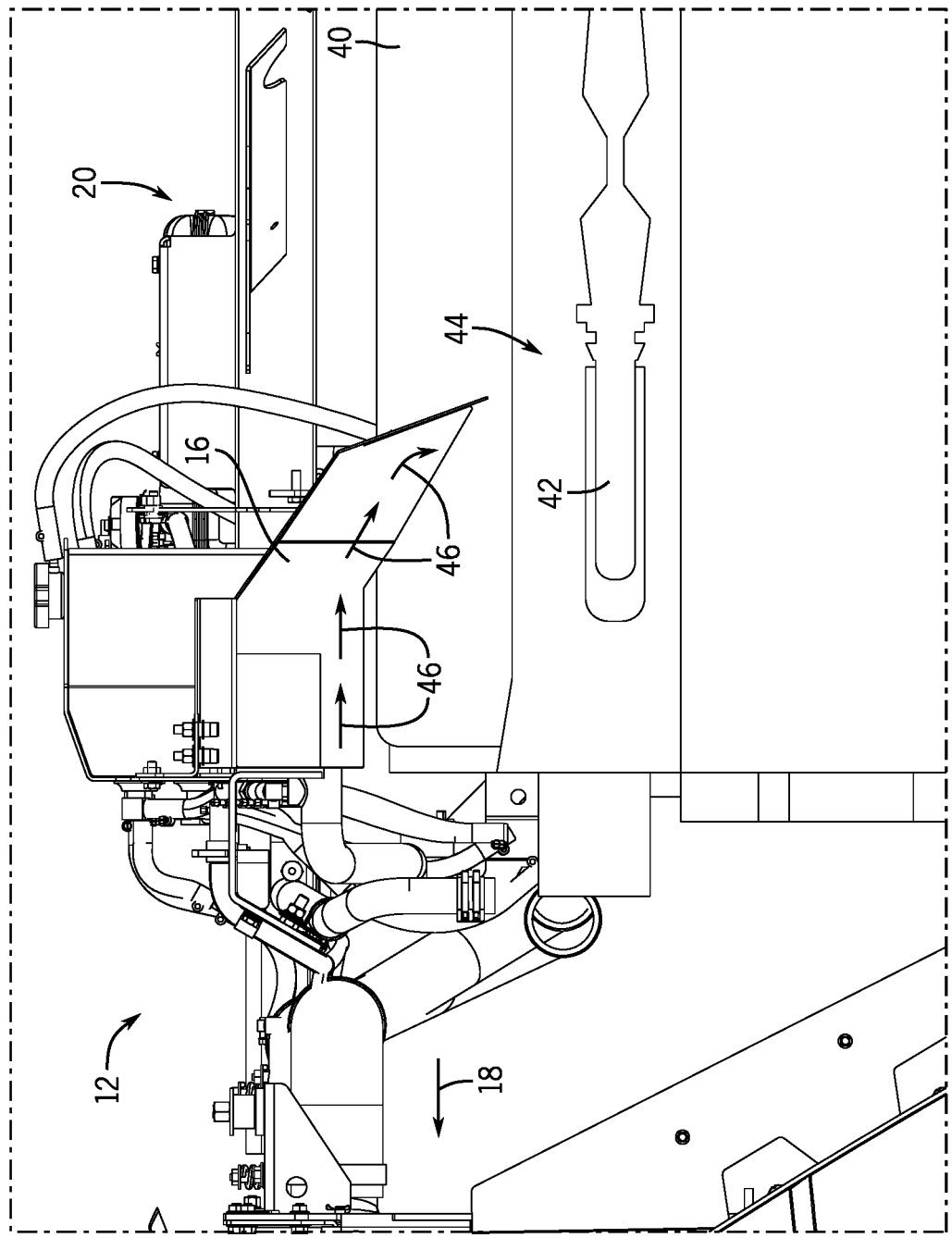
FIG. 2 is a partial cross-sectional view of an engine airflow adjustment system, according to an embodiment of the disclosure.

FIG. 2 is a cross-sectional view of an engine airflow adjustment system 12. The engine 20 may be an internal combustion engine with an engine block 40 that houses one or more pistons that are driven by the combustion of a fuel (e.g., gasoline, diesel). As the engine 20 combusts fuel, the exhaust products (e.g., carbon dioxide, carbon monoxide) of the combustion process are carried away through an exhaust manifold 42. The exhaust manifold 42 fluidly couples to an exhaust pipe on the vehicle 10 which enables the vehicle 10 to discharge the exhaust products. The exhaust manifold 42 couples to the engine block 40 in order to receive the exhaust products of the combustion process. When coupled together, the engine block 40 and the exhaust manifold 42 may form one or more crevices and/or gaps 44 between the engine block 40 and the exhaust manifold 42. Plant debris (e.g., leaves, pieces of plant stocks, pieces of roots) may settle into these crevices 44. Unfortunately, the exhaust products entering the exhaust manifold 42 as well as the engine block 40 may become hot during operation of the vehicle 10. To assist in cooling the engine 20, the vehicle 10 may include one or more fans 18 (e.g., engine fans, radiator fans) that blow cooling air over the engine 20 and that may also provide cooling airflow over a radiator. The airflow from the engine fan 18 enables convective cooling of the radiator, engine block 40, exhaust manifold 42, among other engine components. In order to block and/or reduce the settling of plant debris in one or more crevices 44, the engine airflow adjustment system 12 includes one or more funnels 16. These funnels 16 redirect and/or accelerate airflow 46 from the fan 18 towards one or more crevices 44 on the engine 20 (e.g., crevices formed between the engine block 40 and the exhaust manifold 42).

Figure 3:
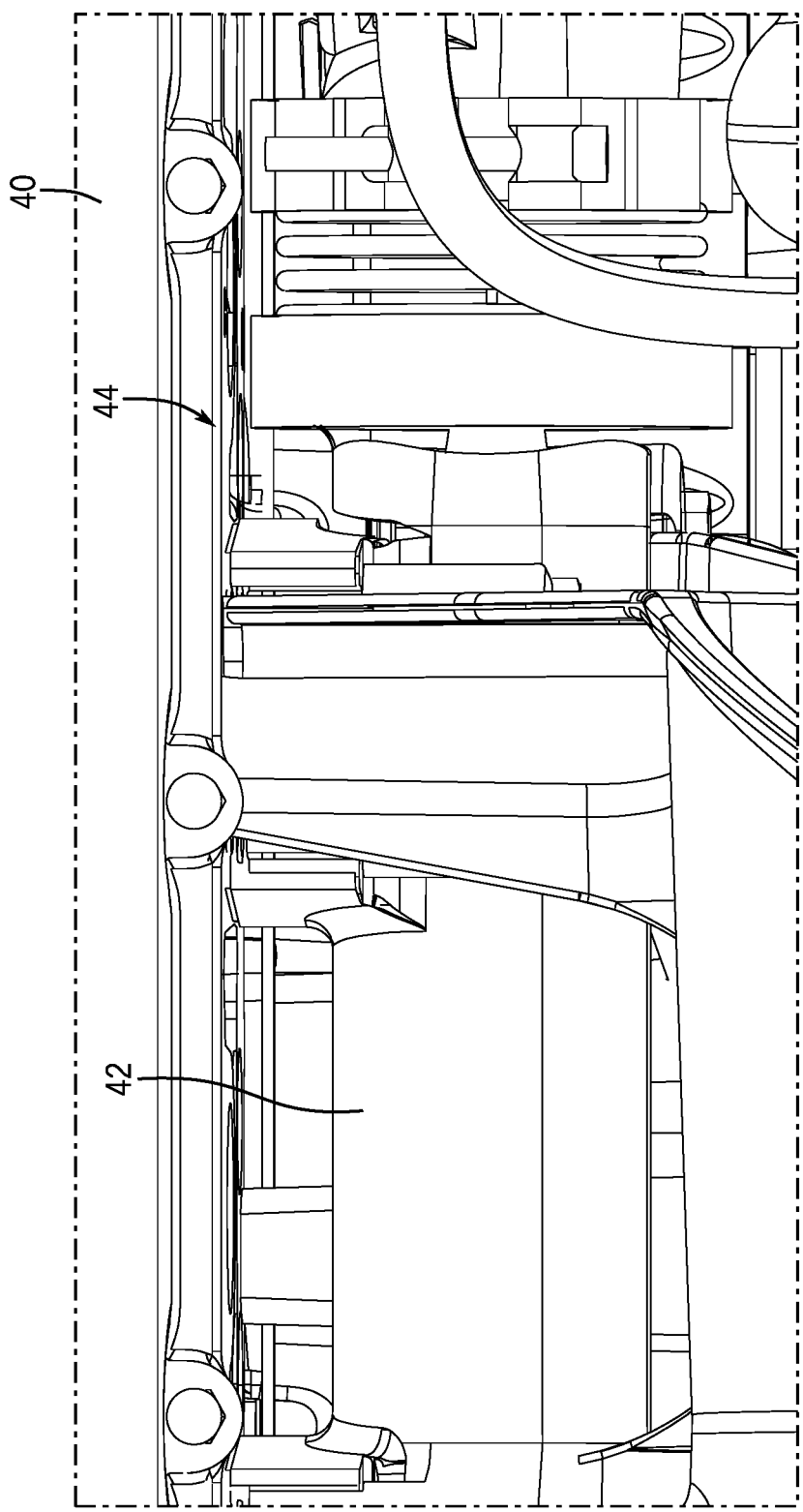
FIG. 3 is a partial top view of the engine, according to an embodiment of the disclosure.

FIG. 3 is a partial top view of the engine 20 that illustrates a crevice 44 between the engine block 40 and the exhaust manifold 42. As illustrated, the crevice 44 may form a narrow gap between the engine block 40 and the exhaust manifold 42 in which plant matter or debris may become lodged. Debris in this location may be undesirable due to the high temperatures of the engine block 40 and/or the exhaust manifold 42. Accordingly, the engine airflow adjustment system 12 may focus and/or increase airflow in vicinity of the crevice 44. The increased airflow may therefore block the settling of debris, reduce the settling of debris, and/or remove debris (e.g., plant debris) from the crevice 44 during operation of the vehicle 10.

Figure 4:
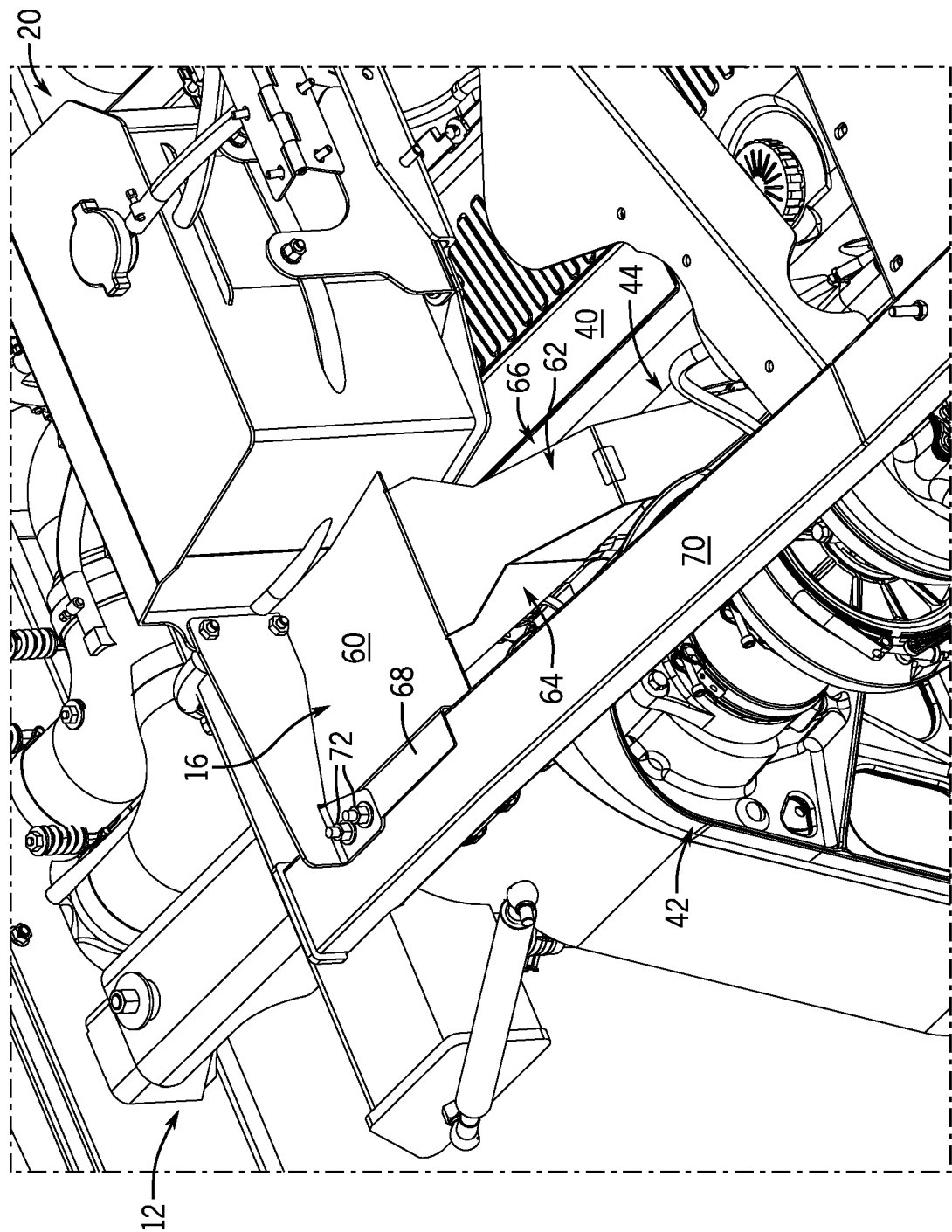
FIG. 4 is a partial top perspective view of an engine airflow adjustment system, according to an embodiment of the disclosure.

FIG. 4 is a top perspective view of the engine airflow adjustment system 12. The engine airflow adjustment system 12 includes the funnel 16, which redirects airflow from the fan 18 towards one or more locations on the engine 20. The funnel 16 includes a top wall 60, a front wall 62 a first sidewall 64, and a second sidewall 66. In operation, a portion of the airflow from the engine fan 18 passes under the top wall 60 where it is focused, accelerated, and directed by the first and second sidewalls 64, 66 to the front wall 62. The front wall 62 is angled, which enables the front wall 62 to direct the airflow to a desired location on the engine 20 (e.g., a crevice). The funnel 16 may couple to the vehicle 10 with one or more flanges. For example, the top wall 60 may include one or more flanges that may couple to an engine frame 70 and/or other components of the engine 20. As illustrated, a flange 68 couples to the engine frame 70 with fasteners 72 (e.g., one or more threaded fasteners).

Figure 5:
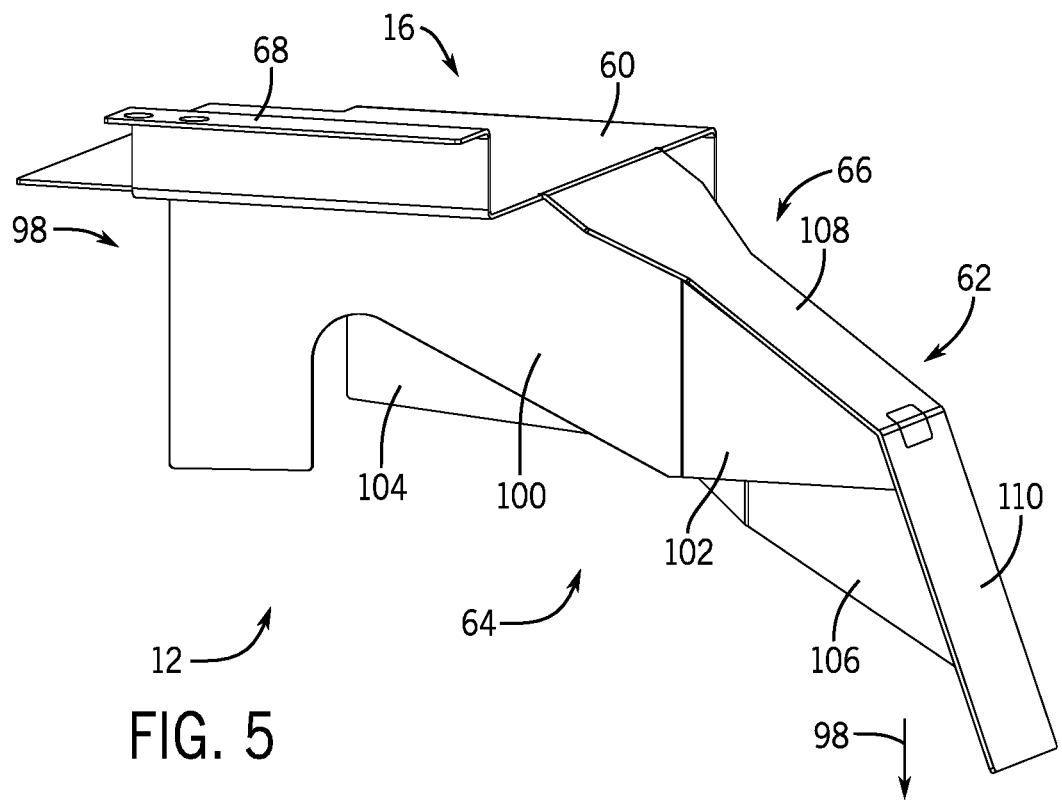
FIG. 5 is a side perspective view of a funnel of the engine airflow adjustment system, according to an embodiment of the disclosure.

FIG. 5 is a perspective view of a funnel 16 of the engine airflow adjustment system 12. As explained above, the funnel 16 includes a top wall 60, a front wall 62, a first sidewall 64, and a second sidewall 66. As illustrated, the first sidewall 64 and the second sidewall 66 couple to the top wall 60 and to the front wall 62 to form a cavity 96. The cavity 96 receives airflow from the fan 18 and directs the airflow to the front wall 62, which then directs the airflow in direction 98. The first sidewall 64 may include one or more sidewall portions. For example, the first sidewall 64 may include a first sidewall portion 100 and a second sidewall portion 102. The second sidewall 66 may similarly include one or more sidewall portions. For example, the second sidewall 66 may include a first sidewall portion 104 and a second sidewall portion 106. In some embodiments, the front wall 62 may also include front wall portions. That is, the front wall 62 may include a first front wall portion 108 and a second front wall portion 110. In some embodiments, the front wall 62, the first sidewall 64, and the second sidewall 66 may be formed from additional or fewer portions (e.g., 1, 2, 3, 4, 5).

Figure 6:
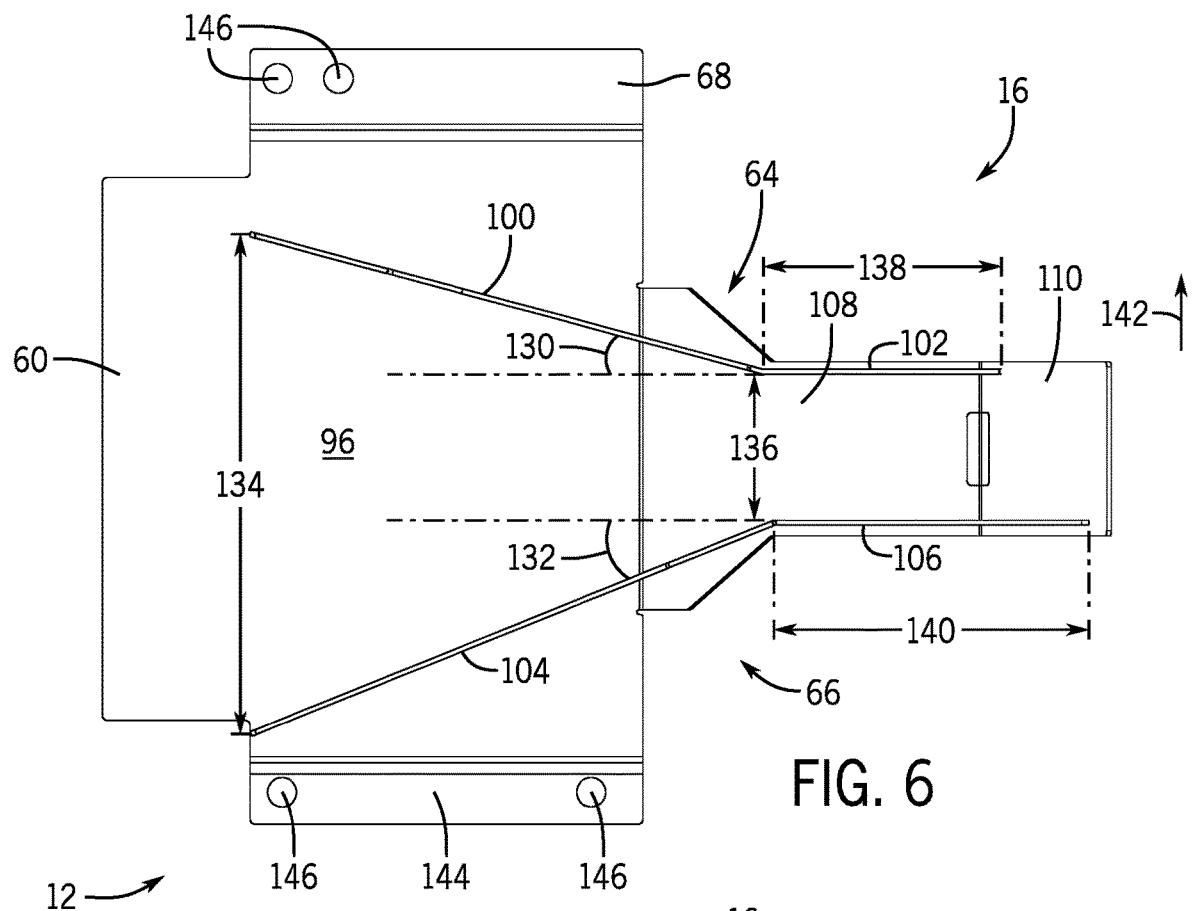
FIG. 6 is a bottom view of the funnel in FIG. 5, according to an embodiment of the disclosure.

FIG. 6 is a bottom view of the funnel 16 in FIG. 5. In order to increase the amount of air flowing through the funnel 16, and thus the velocity of the airflow, the first sidewall portion 100 of the first sidewall 64 and the first sidewall portion 104 of the second sidewall 66 may be angled relative to the respective second sidewall portion 102 of the first sidewall 64 and the second sidewall portion 106 of the second sidewall 66. For example, the first sidewall portion 100 may form an angle 130 (e.g., 1-89°, 10-70°, 20-60°, 30-50°) with respect to the second sidewall portion 102 of the first sidewall 64. The first sidewall portion 104 of the second sidewall 66 may also form an angle 132 (e.g., 1-89°, 10-70°, 20-60°, 30-50°) with the second sidewall portion 106. Depending on the embodiment, the angles 130 and 132 may be the same or different.

As illustrated, the angles 130 and 132 of the respective first sidewall portion 100 of the first sidewall 64 and the first sidewall portion 104 of the second sidewall 66 gradually reduce the width of the cavity 96 from a maximum width 134 to a minimum width 136. The change in the width of the cavity 96 focuses the airflow through the funnel 16, which in turn increases the velocity of the airflow. The increased velocity of the airflow enables the funnel 16 to drive debris out of cavities/crevices and/or reduce deposition of plant debris in the cavities/crevices. In some embodiments, the length 138 of the second sidewall portion 102 of the first sidewall 64 may be less than the length 140 of second sidewall portion 106 of the second sidewall 66. This difference may enable the funnel 16 to direct some of the airflow outward in direction 142 to facilitate driving debris in direction 142 as it is blown out of the cavities/crevices of the engine 20. It should also be noted that the funnel 16 may include another flange 144 that facilitates attachment to the frame 70 and/or other components of the engine 20. The flanges 68 and 144 define one or more apertures 146 that receive respective fasteners (e.g., threaded fasteners).

Figure 7:
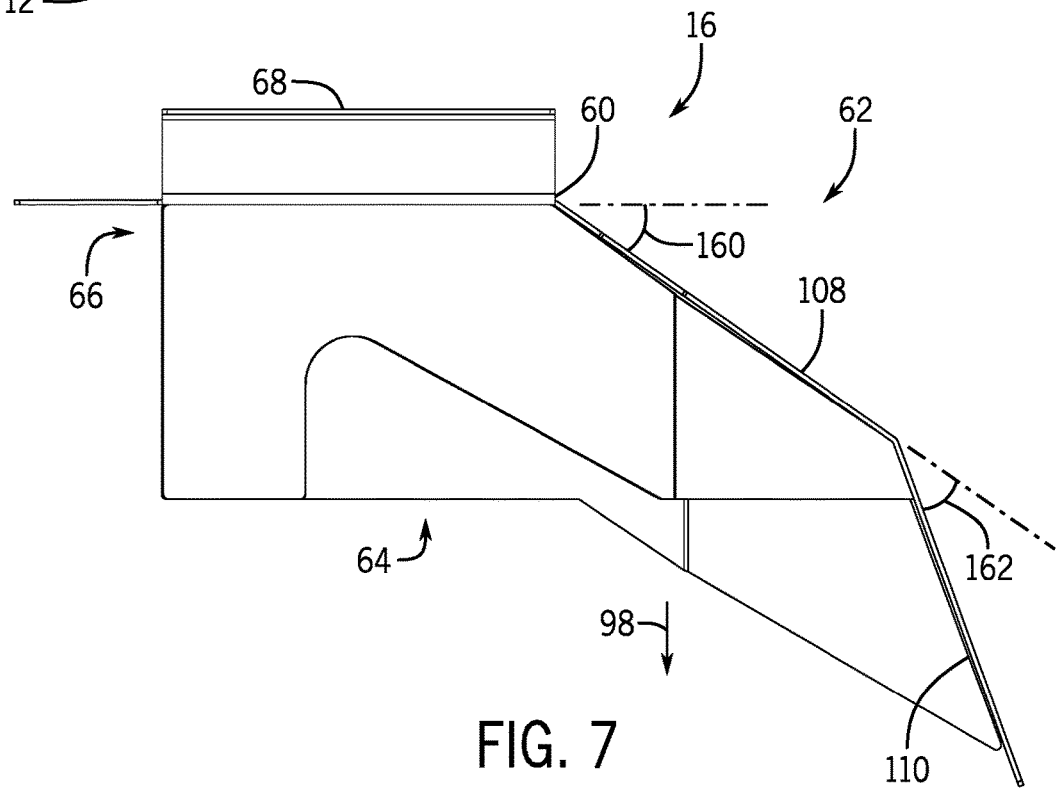
FIG. 7 is a side view of a funnel of the engine airflow adjustment system, according to an embodiment of the disclosure.

FIG. 7 is a side view of the funnel 16 of the engine airflow adjustment system 12. As explained above, the front wall 62 may include a first front wall portion 108 and a second front wall portion 110. The first front wall portion 108 and the second front wall portion 110 may be angled relative to each other and to the top wall 60. For example, the first front wall portion 108 may form an angle 160 (e.g., 10-70°, 20-60°, 30-50°) with the top wall 60. This angle 160 guides the airflow entering the funnel 16 towards second funnel portion 110 as well as downward in direction 98. The second front wall portion 110 may likewise form an angle 162 (e.g., 10-70°, 20-60°, 30-50°) but with the first front wall portion 108. The angle 162 of the second front wall portion 110 likewise guides the airflow through the funnel 16 and downwards in direction 98. Depending on the embodiment, the angles 160 and 162 may be the same or different. For example, the angle 160 may be less than angle 162 enabling airflow entering the funnel 16 to be gradually directed downward in a direction 98 before encountering the steeper/greater angle 162 of the second front wall portion 110, which further directs the airflow in direction 98. In some embodiments the opposite may occur, with angle 160 being greater than the angle 162 to create a sharper redirection of the airflow in direction 98 before gradually guiding the airflow the remainder of the way through the funnel 16.

Figure 8:
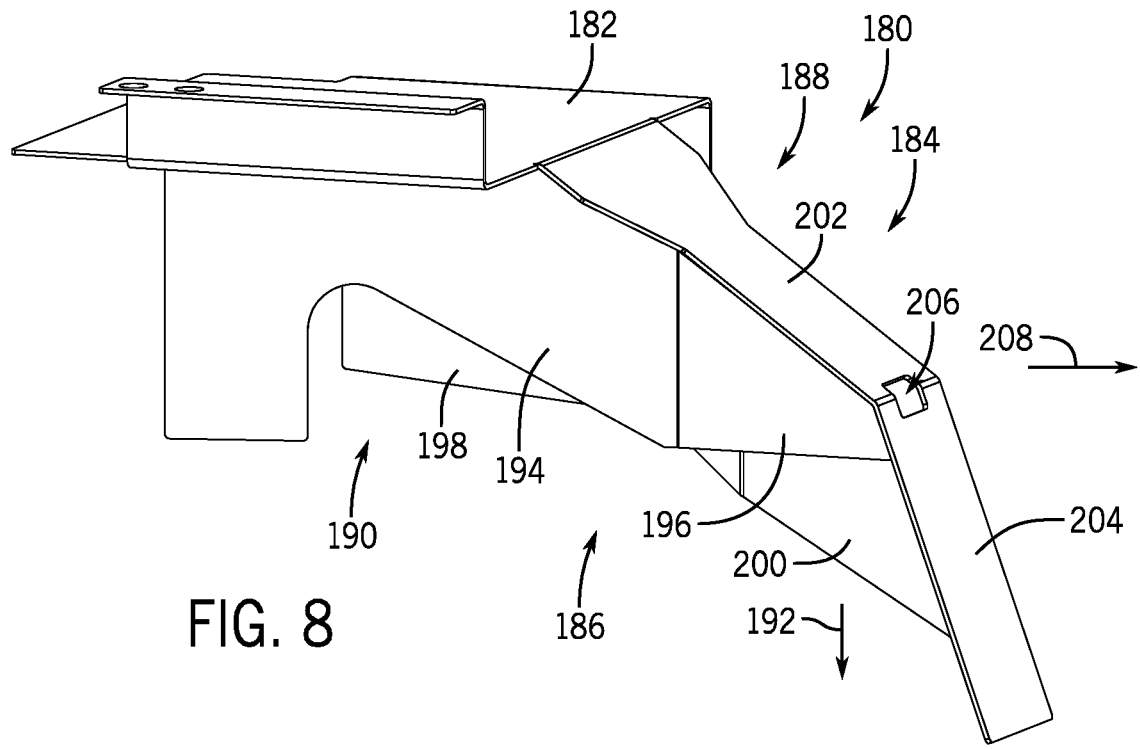
FIG. 8 is a side perspective view of a funnel of the engine airflow adjustment system, according to an embodiment of the disclosure.

FIG. 8 is a perspective view of a funnel 180 of the engine airflow adjustment system 12. The funnel 180 includes a top wall 182, a front wall 184, a first sidewall 186, and a second sidewall 188. As illustrated, the first sidewall 186 and the second sidewall 188 couple to the top wall 182 and to the front wall 184 to form a cavity 190. The cavity 190 receives airflow from the engine fan 18 and directs the airflow to the front wall 184, which then directs the airflow in direction 192. The first sidewall 186 may include one or more sidewall portions. For example, the first sidewall 186 may include a first sidewall portion 194 and a second sidewall portion 196. The second sidewall 188 may similarly include one or more sidewall portions. For example, the second sidewall 188 may include a first sidewall portion 198 and a second sidewall portion 200. In some embodiments, the front wall 184 may also include front wall portions. As illustrated, the front wall 184 may include a first front wall portion 202 and a second front wall portion 204. In some embodiments, the front wall 184, the first sidewall 186, and the second sidewall 188 may be formed from additional or fewer portions (e.g., 1, 2, 3, 4, 5).

As explained above, plant debris may be blown over the engine 20. For example, the engine fan 18 may blow debris over or onto the engine. The funnel 180 may receive this debris, which may then be redirected downwards in direction 192. In order to block and/or reduce blowing debris downward in direction 192 and into cavities a crevices between components of the engine 20, the funnel 180 may include one or more apertures 206 in the front wall 184. In operation, air enters the cavity 190 formed by the sidewalls 186 and 188. The sidewalls 186 and 188 channel and accelerate the airflow through the funnel 180 where the airflow contacts the front wall 184. Without an aperture 206, the debris may follow the path of the airflow, which is directed downwards in direction 192 by the front wall 184. To block the redirection of debris in direction 192 towards the engine 20, the front wall 184 includes the aperture 206. The aperture 206 may enable debris to escape the funnel 180 where it may travel in direction 208 over the engine 20. As illustrated, the aperture 206 may extend between the first front wall portion 202 and the second front wall portion 204. In other words the aperture 26 may be placed where the first front wall portion 202 and the second front wall portion 204 are joined. Because the first front wall portion 202 and the second front wall portion 204 are angled relative to each other, an aperture at this location may facilitate removal of the debris from the funnel 180. More specifically, debris may travel along the surface of the first front wall portion 202 where it encounters the aperture 206 enabling the debris to escape the funnel 180 before being redirected by the second front wall portion 204.

Figure 9:
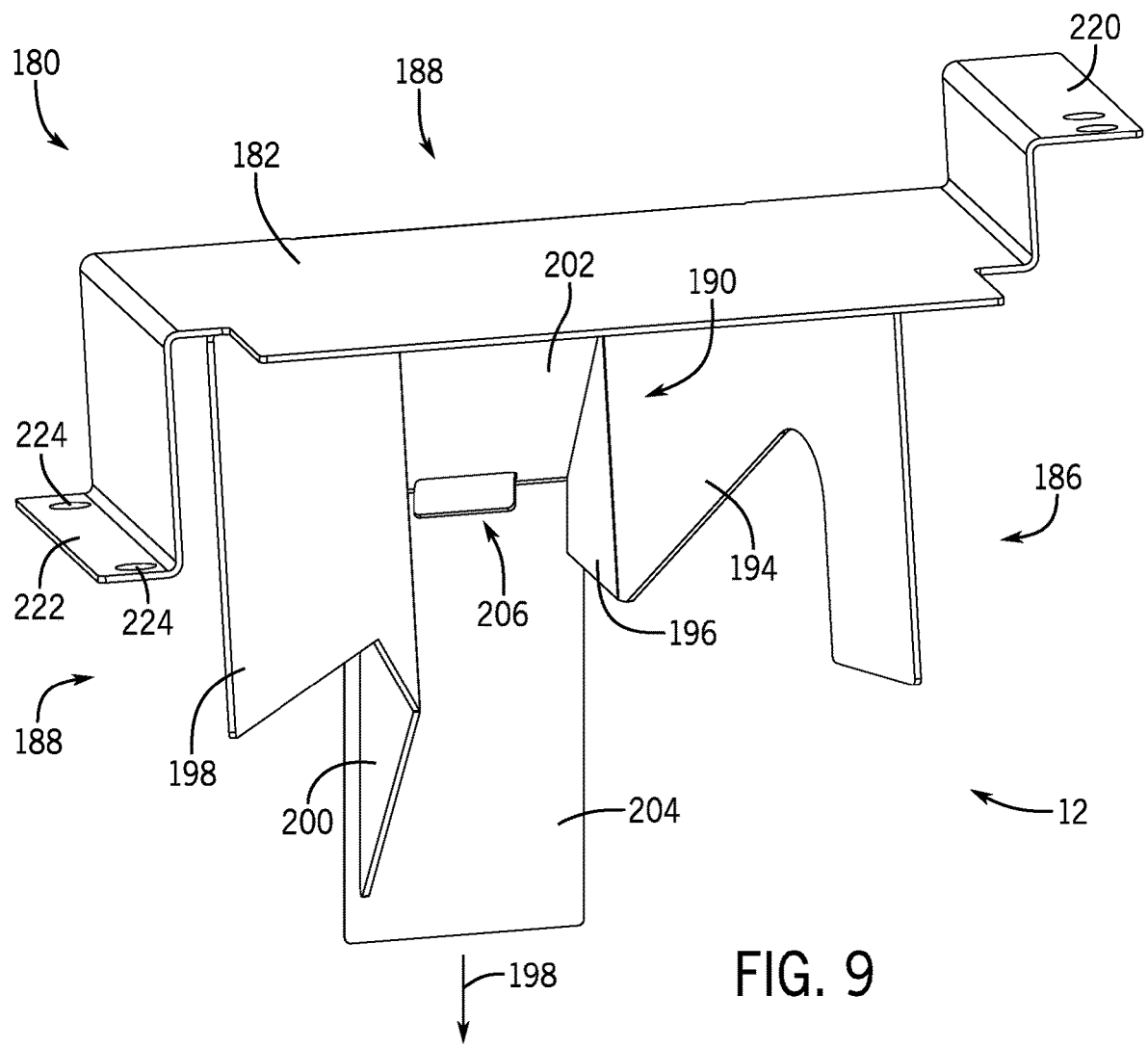
FIG. 9 is a rear perspective view of the funnel in FIG. 9, according to an embodiment of the disclosure.

FIG. 9 is a rear perspective view of the funnel 180 in FIG. 8. As illustrated, the funnel 180 may include one or more flanges. For example, the funnel 180 may include a first flange 220 and a second flange 222. The flanges 220 and 222 include apertures 224 that enable the funnel 180 to receive fasteners (e.g., threaded fasteners) that couple the funnel to the frame 70 and/or engine components of the engine 20. The flanges 222 and 224 may project in different directions away from the top wall 182 in order to facilitate coupling. Furthermore, the sidewalls 186 and 188 may have different shapes and/or grooves to accommodate placement and coupling of the funnel 180 to the engine 20.

In order to increase the amount of air flowing through the funnel 180, and thus the velocity of the airflow, the first sidewall portion 194 of the first sidewall 186 and the first sidewall portion 198 of the second sidewall 188 may be angled relative to the respective second sidewall portion 196 of the first sidewall 186 and the second sidewall portion 200 of the second sidewall 188. For example, the first sidewall portion 194 may form an angle between 1-89°, 10-70°, 20-60°, and 30-50° with respect to the second sidewall portion 196 of the first sidewall 186. The first sidewall portion 198 of the second sidewall 188 may also form an angle between 1-89°, 10-70°, 20-60°, and 30-50° with the second sidewall portion 200. Depending on the embodiment, these angles may be the same or different.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. An engine airflow adjustment system, comprising:
an engine configured to power operation of a vehicle;
a fan configured to drive an airflow over the engine to convectively cool the engine; and
a funnel configured to receive a portion of the airflow from the fan and direct the airflow to a specific location on the engine to blow debris off of the engine, the funnel comprising a front wall configured to direct the airflow from the fan towards the engine, wherein:
the front wall comprises a first front wall portion and a second front wall portion, and wherein the first front wall portion is angled relative to the top wall and the second front wall portion is angled relative to the first front wall portion, and
the front wall defines an aperture, the aperture extends between the first front wall portion and the second front wall portion, and wherein the aperture is configured to redirect debris entering the funnel.

2. The system of claim 1, comprising a frame surrounding the engine, wherein the funnel is configured to couple to the frame.

3. The system of claim 1, wherein the funnel comprises a first sidewall and a second sidewall separated from each other by a gap.

4. The system of claim 3, wherein the first sidewall comprises a first sidewall portion and a second sidewall portion, and the second sidewall comprises a third sidewall portion and a fourth sidewall portion.

5. The system of claim 4, wherein the first sidewall portion and the third sidewall portion are substantially parallel to each other.

6. The system of claim 5, wherein the second sidewall portion and the fourth sidewall portion are angled relative to the respective first sidewall portion and the third sidewall portion, and wherein the second sidewall portion and fourth sidewall portion are configured to funnel airflow from the fan into the gap formed by the first sidewall portion and the third sidewall portion.

7. The system of claim 1, wherein an angle formed by the first front wall portion and the second front wall portion is between 10-60 degrees.

8. An engine airflow adjustment system, comprising:
   a funnel configured to receive a portion of an airflow from a fan and redirect the airflow to a specific location on an engine to blow debris off of the engine, the funnel comprises:
   a first sidewall, the first sidewall comprises:
      a first sidewall portion and a second sidewall portion, wherein the first sidewall portion is angled relative to the second sidewall portion;
   a second sidewall separated from the first sidewall by a gap, the second sidewall comprises:
      a third sidewall portion and a fourth sidewall portion, wherein the third sidewall portion is angled relative to the fourth sidewall portion;
   a top wall coupled to the first sidewall and the second sidewall; and
   a front wall coupled to the first sidewall and the second sidewall and configured to redirect the airflow from the fan towards the engine, the front wall comprising a first front wall portion and a second front wall portion, and wherein:
      the first front wall portion is angled relative to the top wall and the second front wall portion is angled relative to the first front wall portion, and
      the front wall defines an aperture, and wherein the aperture extends between the first front wall portion and the second sidewall portion.

9. The system of claim 8, wherein the first sidewall portion and the third sidewall portion are substantially parallel to each other.

10. The system of claim 8, wherein an angle formed by the first front wall portion and the second front wall portion is between 10-60 degrees.

11. An engine airflow adjustment system, comprising:
    a funnel configured to receive a portion of an airflow from a fan and redirect the airflow to a specific location on an engine to blow debris off of the engine, the funnel comprises:
    a top wall;
    a first sidewall coupled to the top wall;
    a second sidewall coupled to the top wall and separated from the first sidewall by a gap;
    a front wall coupled to the first sidewall and the second sidewall and configured to direct the airflow from the fan towards the engine, the front wall comprises:
       a first front wall portion, wherein the first front wall portion is angled relative to the top wall; and
       a second front wall portion, wherein the second front wall portion is angled relative to the first front wall portion,
    wherein the front wall defines an aperture, and wherein the aperture extends between the first front wall portion and the second front wall portion.

12. The system of claim 11, wherein an angle formed by the first front wall portion and the second front wall portion is between 10-60 degrees.

13. The system of claim 11, wherein the first sidewall comprises a first sidewall portion and a second sidewall portion, and wherein the first sidewall portion is angled relative to the second sidewall portion.

14. The system of claim 11, wherein the second sidewall comprises a third sidewall portion and a fourth sidewall portion, and wherein the third sidewall portion is angled relative to the fourth sidewall portion.

* * * * *